United States Patent [19]

Yoshioka et al.

[11] Patent Number: 5,216,238
[45] Date of Patent: Jun. 1, 1993

[54] INFRARED RAY RECEIVING CIRCUIT

[75] Inventors: Takakazu Yoshioka, Tokyo; Masahiko Hirayama, Kanagawa, both of Japan

[73] Assignee: NEC Corporation, Tokyo, Japan

[21] Appl. No.: 774,719

[22] Filed: Oct. 9, 1991

[30] Foreign Application Priority Data

Oct. 9, 1990 [JP] Japan .................. 2-271746

[51] Int. Cl.$^5$ ........................... H01J 40/14
[52] U.S. Cl. .................. 250/214 A; 359/189
[58] Field of Search ........... 250/214 A, 214 C, 214 R; 359/189; 307/311, 350, 354

[56] References Cited

U.S. PATENT DOCUMENTS 4,072,870  2/1978  Davis .................. 307/354
4,085,411  4/1978  Genesi ................. 307/311
5,155,353  10/1992 Pahr .................. 250/214 R Primary Examiner—David C. Nelms
Assistant Examiner—Stephone B. Allen

[57] ABSTRACT

An infrared ray receiving circuit includes a band pass filter including two variable transconductance amplifiers, a detector including a differential switch, and a wave-form shaping circuit including a hysteresis comparator. In the infrared ray receiving circuit, the hysteresis width of the hysteresis comparator can be adjusted, so that generation of hair peaks in the output signal of the hysteresis comparator can be avoided. In addition, the generation of an output signal having a pulse width which is shorter than a prescribed pulse width can be avoided.

5 Claims, 14 Drawing Sheets

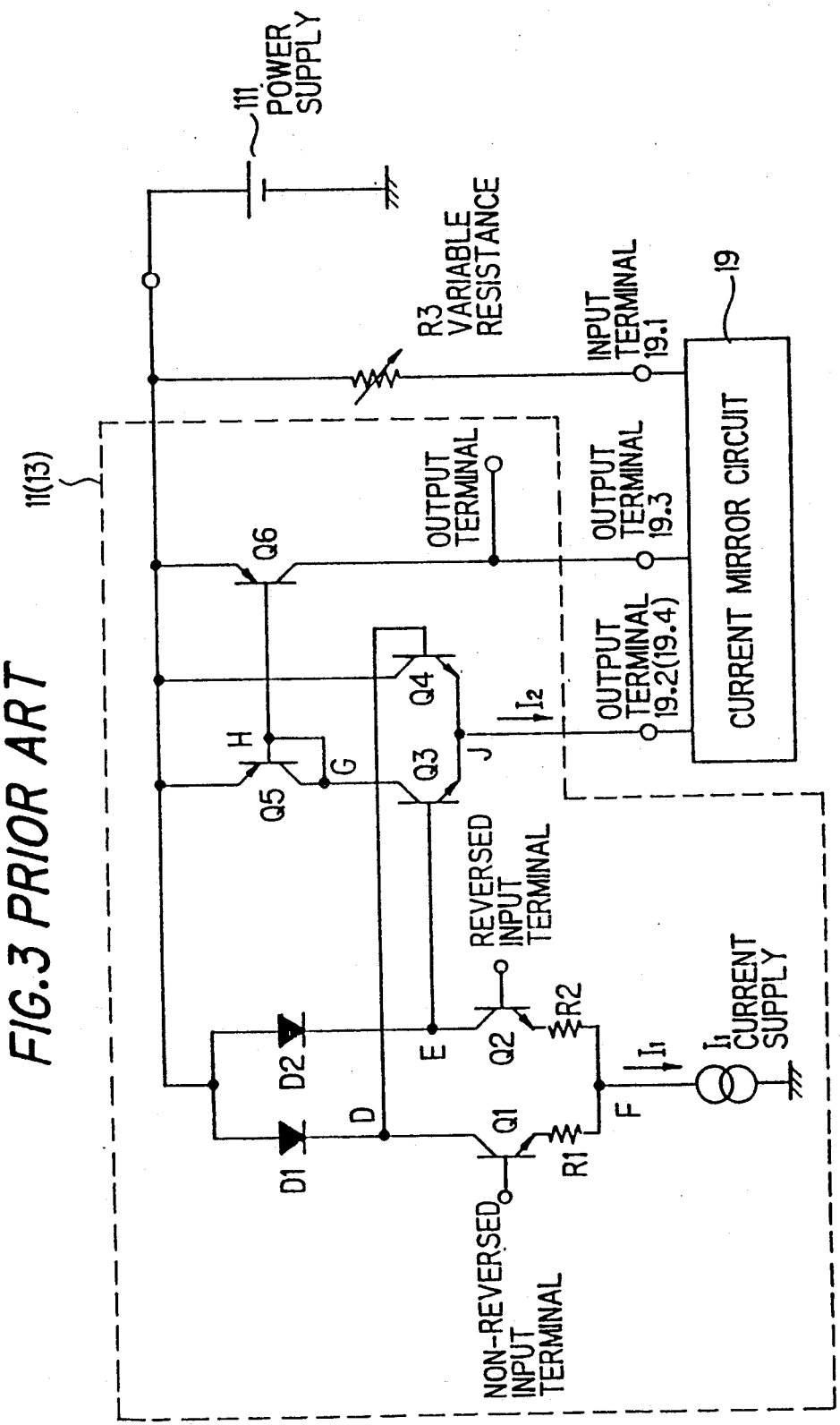

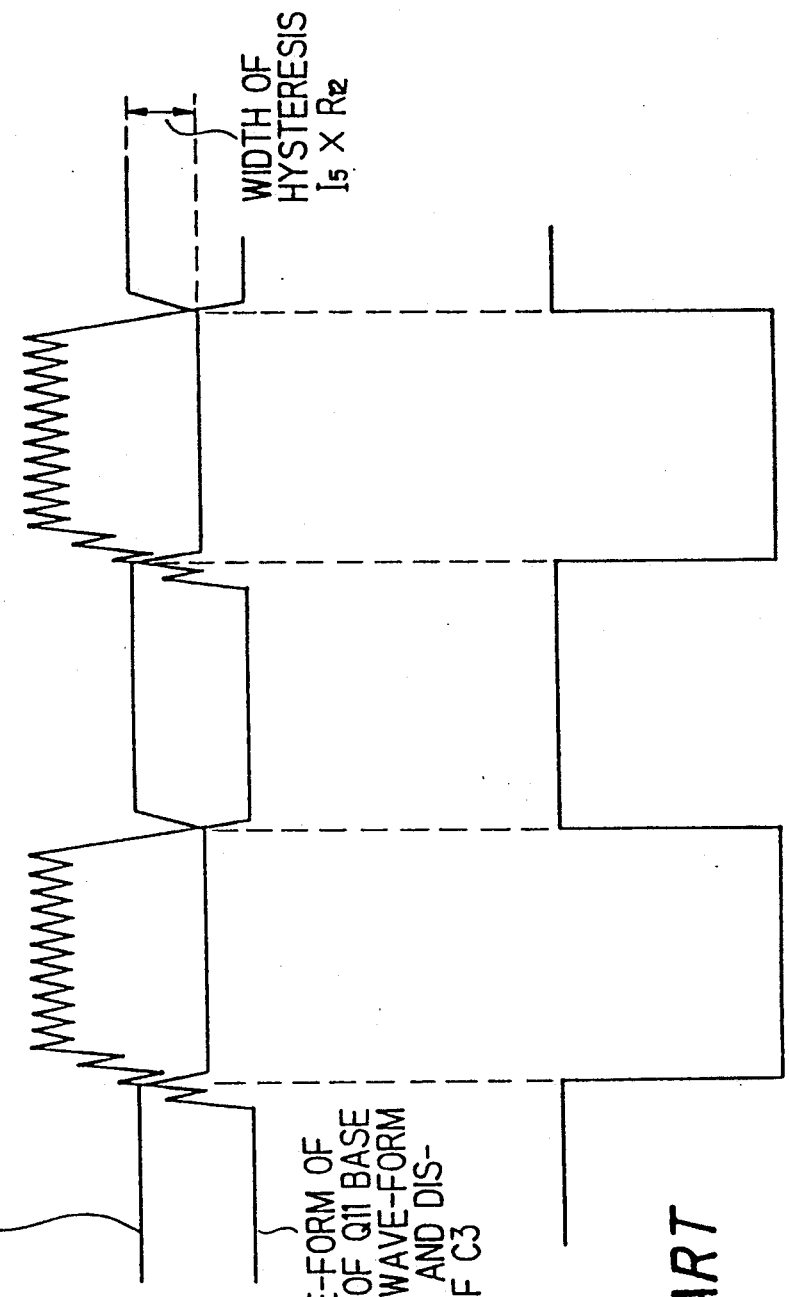

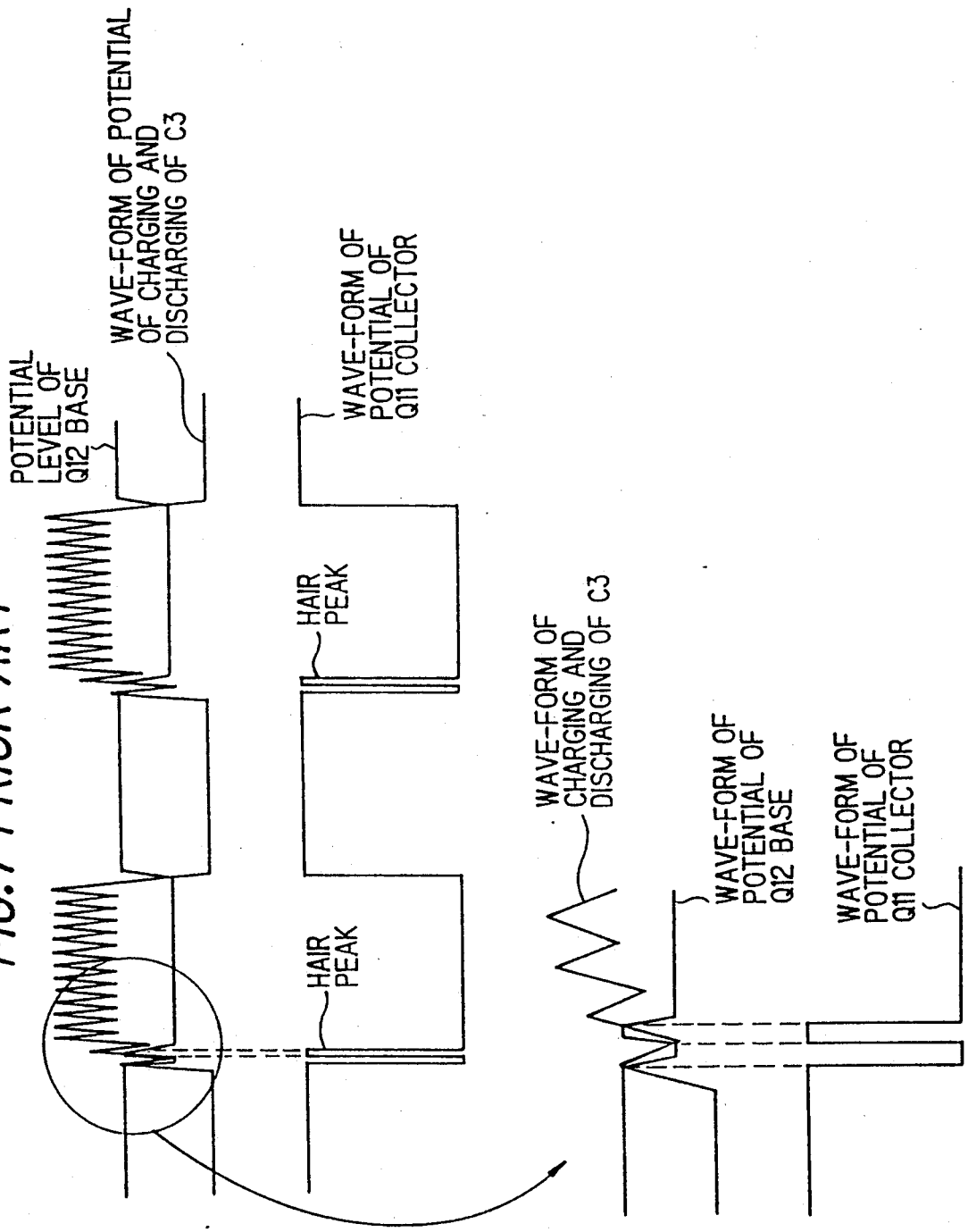

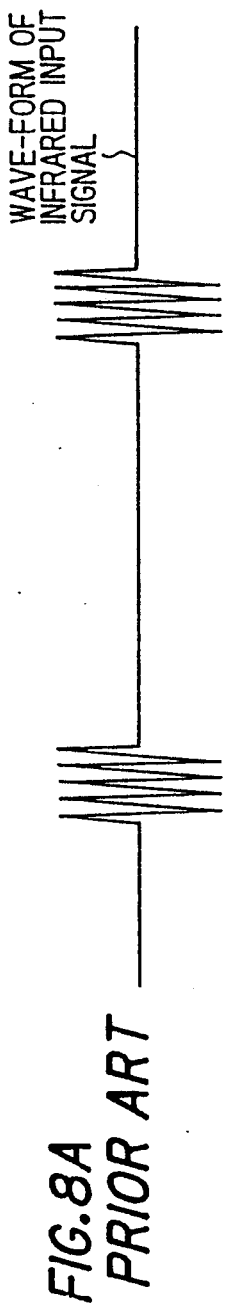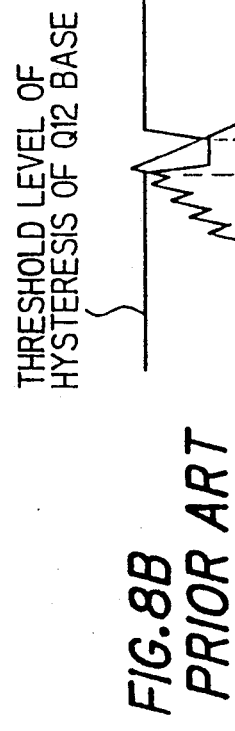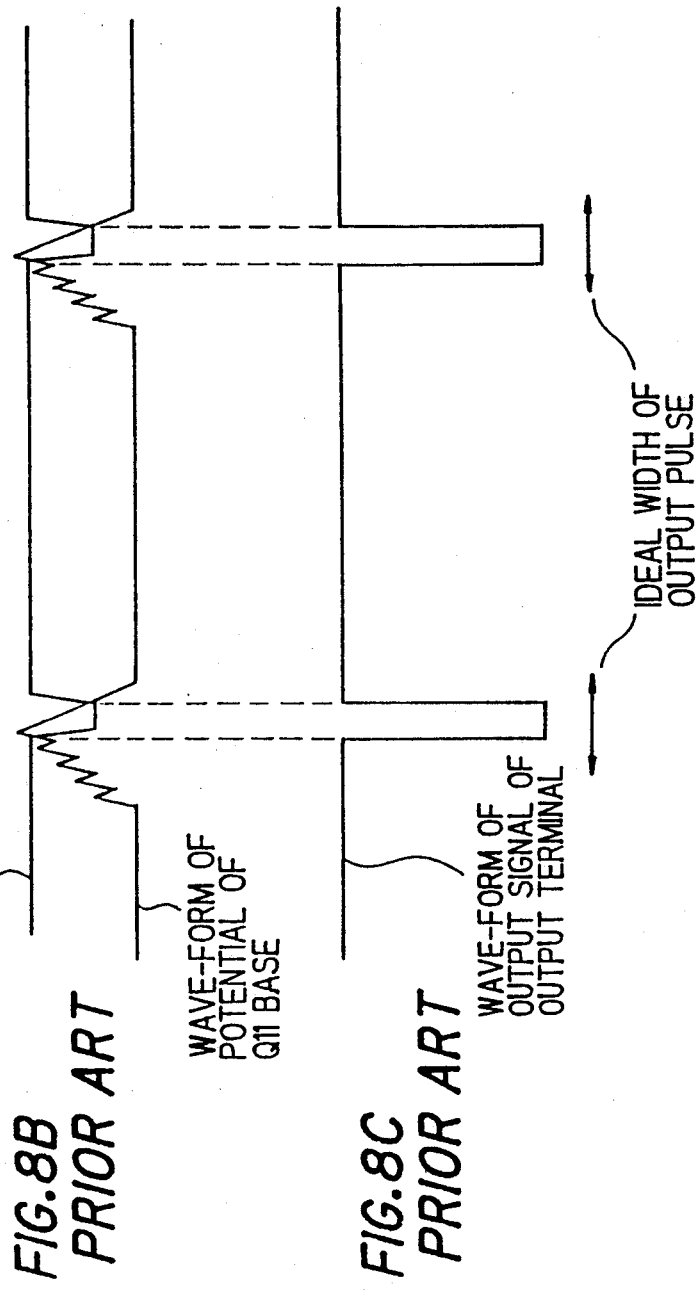
FIG.8A PRIOR ART
FIG.8B PRIOR ART
FIG.8C PRIOR ART

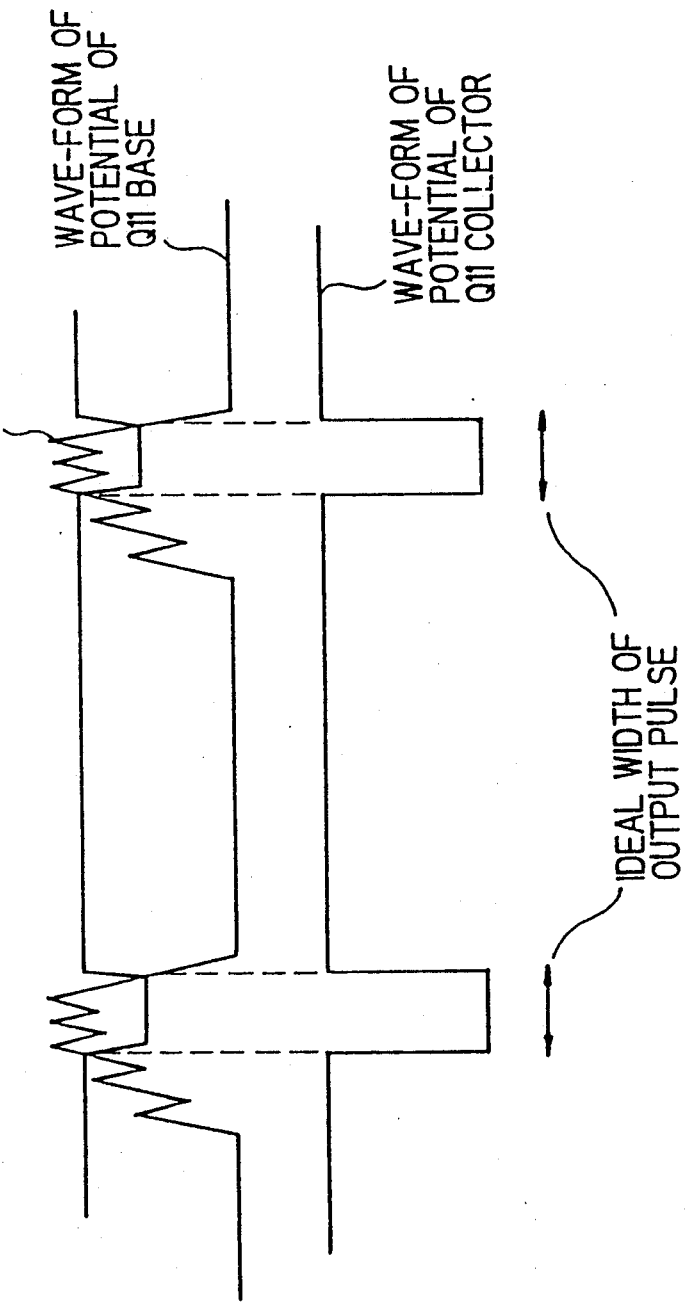

INFRARED RAY RECEIVING CIRCUIT

FIELD OF THE INVENTION

This invention relates to an infrared ray receiving circuit, and more particularly to, an infrared ray receiving circuit for detecting a pulse position modulation (defined as "PPM" hereinafter) signal of infrared rays.

BACKGROUND OF THE INVENTION

A conventional infrared ray receiving circuit includes an infrared ray detector such as a PIN photodiode in general, an amplifier such as a differential amplifier, a band pass filter (defined as "BPF" hereinafter), a detector, and a wave-form shaping circuit.

In operation, an infrared ray LED is turned on and off in an infrared ray transmitting apparatus dependent on a pulse signal, so that a PPM signal of an infrared ray carrier wave having a specific wavelength is generated to be transmitted to the infrared ray receiving circuit and received by the infrared detector therein. The infrared ray detector detects the PPM signal to provide the amplifier with an optical to electric converted PPM signal. The amplifier amplifies the PPM signal with an adequate gain to be supplied to the BPF. The BPF which is tuned with the carrier wave of the PPM signal removes unnecessary signals and noises from the amplified PPM signal to supply the tuned PPM signal to the detector.

The detector detects the PPM signal having low and high durations to be supplied to the wave-form shaping circuit. The wave-form shaping circuit generates a pulse signal in accordance with the PPM signal having the low and high durations supplied from the detector, so that the pulse signal is supplied to an output terminal to be connected to a device such as a microcomputer, etc. In the generation of the pulse signal, an output signal of the detector which is a potential of a capacitor provided therein is compared with a hysteresis threshold level of a hysteresis comparator in the wave-form shaping circuit.

According to the conventional infrared ray receiving circuit, however, there is a disadvantage in that hair peaks are generated in the pulse signal which is the output signal of the hysteresis comparator, in a case where a difference of charge and discharge voltages of the capacitor provided in the detector is greater than a hysteresis width of the hysteresis comparator. On the other hand, when a capacitance of the capacitor is set to be larger to suppress the generation of the hair peaks, the output potential of the detector does not increase to be high sufficiently, if the PPM signal having a short ON duration is supplied thereto, so that the pulse width of the output signal of the hysteresis comparator becomes shorter than a prescribed width. The output signal of the hysteresis comparator is an output signal to be supplied to the output terminal as an output signal of the infrared ray receiving circuit. Therefore, the generation of the hair peaks in the output pulse signal or shortness of the pulse width thereof causes mulfunction of the device such as a microcomputer connected with the output terminal.

SUMMARY OF THE INVENTION

Accordingly, it is an object of the invention to provide an infrared ray receiving circuit in which the hysteresis width of the hysteresis comparator can be adjusted to avoid generation of hair peaks in the output signal of the hysteresis comparator.

It is another object of the invention to provide an infrared ray receiving circuit in which the output signal is generated to have a pulse width as precise as originally modulated.

According to a feature of the invention, an infrared receiving circuit comprises:

a band pass filter comprising first and second variable trans-conductance amplifiers, the band pass filter being supplied with an input PPM signal;

a detector comprising a differential switch, the detector being supplied with an output signal of the band pass filter; and a wave-form shaping circuit comprising a hysteresis comparator, the wave-form shaping circuit being supplied with an output signal of the detector;

wherein the first and second variable transconductance amplifiers of the band pass filter are controlled by first and second output signals of first and second output terminals of a current mirror circuit; and the hysteresis comparator of the wave-form shaping circuit is controlled by a third output signal of a third output terminal of the current mirror circuit, whereby a hysteresis width of the hysteresis comparator is adjusted by the third output signal of the current mirror circuit.

BRIEF DESCRIPTION OF THE DRAWINGS

The invention will be explained in more detail in conjunction with appended drawings wherein:

FIG. 3 is a circuitry diagram of a variable trans-conductance amplifier used in a band pass filter of the conventional infrared ray receiving circuit in FIG. 2;

FIG. 6 is a diagram showing wave-forms of signals in the hysteresis comparator of the wave-form shaping circuit of the conventional infrared ray receiving circuit;

FIGS. 7 and 8A to 8C are diagrams showing wave-forms of signals for explaining disadvantages in the conventional infrared ray receiving circuit;

FIGS. 13 and 14 are diagrams showing wave-forms of signals for explaining advantages of the infrared ray receiving circuit in the second preferred embodiment.

DESCRIPTION OF THE PREFERRED EMBODIMENTS

Before describing an infrared ray receiving circuit in preferred embodiments according to the invention, the conventional infrared ray receiving circuit described before will be explained in conjunction with FIGS. 1 to 8.

Figure 1:
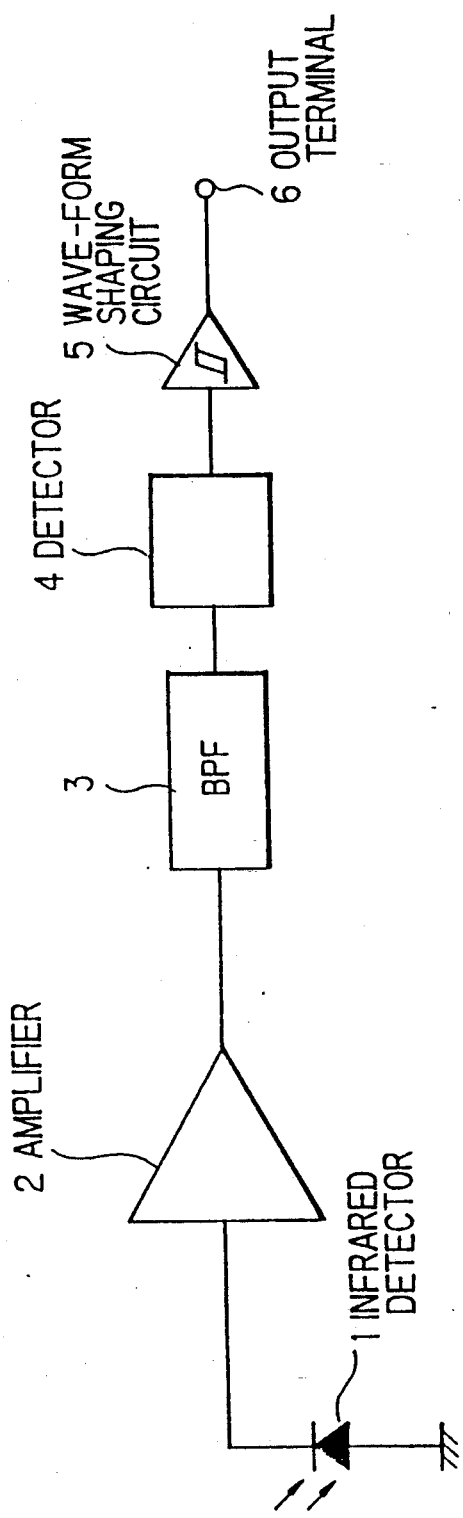
FIG. 1 is a block diagram of a conventional infrared ray receiving circuit.

FIG. 1 shows a conventional infrared ray receiving circuit. The conventional infrared ray receiving circuit includes an infrared ray detector 1, an amplifier 2, a BPF 3, a detector 4, and a wave-form shaping circuit 5.

In operation, a PPM signal consisting of a carrier wave of a specific wavelength having ON and OFF durations is transmitted from a transmitting apparatus to an infrared ray receiving circuit and received by the infrared ray detector 1. The infrared detector 1 detects the PPM signal to be supplied to the amplifier 2. The amplifier 2 amplifies the PPM signal with an adequate gain to supply the amplified PPM signal to the BPF 3. The BPF 3 which is tuned with the carrier wave of the PPM signal removes unnecessary signals or noises from the PPM signal to supply the tuned PPM signal to the detector 4. The detector 4 detects the PPM signal having low and high durations to be supplied to the wave-form shaping circuit 5. The wave-form shaping circuit 5 generates a pulse signal determined by the low and high durations of the PPM signal supplied from the detector 4, and supplies the pulse signal to an output terminal 6 connected to a device such as a microcomputer, etc.

Figure 2:
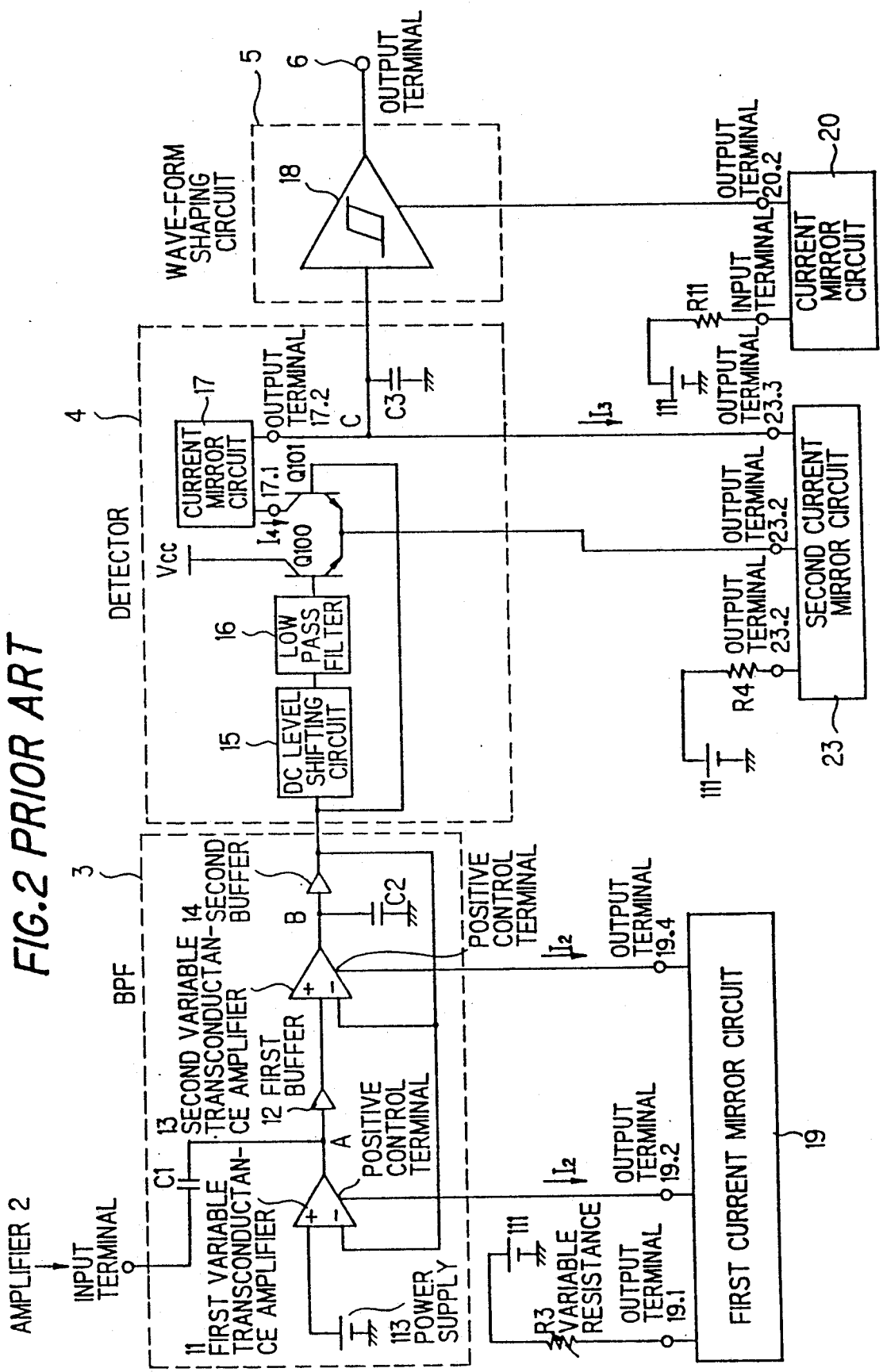
FIG. 2 is a more detailed block diagram of a part of the conventional infrared ray receiving circuit in FIG. 1.

FIG. 2 shows detailed circuitry structures of the BPF 3, the detector 4 and the wave-form shaping circuit 5 in the infrared ray receiving circuit.

The BPF 3 includes first and second variable trans-conductance amplifiers 11 and 13, first and second buffers 12 and 14. The first variable trans-conductance amplifier 11 is connected at a non-reversed input terminal to a positive terminal of a power supply 113, at a reversed input terminal to an output terminal of the second buffer 14, at an output terminal to a nodal point A, and at a positive control terminal to an output 19.2 of a first current mirror circuit 19. The first buffer 12 is connected at an input terminal to the nodal point A and at an output terminal to a non-reversed input terminal of the second variable trans-conductance amplifier 13. The second variable trans-conductance amplifier 13 is connected at a reversed input terminal to an output terminal of the second buffer 14, at an output terminal to a nodal point B, and at a positive control terminal to an output terminal 19.4 of the first current mirror circuit 19. The second buffer 14 is connected at an input terminal to the nodal point B and at an output terminal to an input of the detector 4. An input terminal of the BPF 3 which is connected to the amplifier 2 is connected to the nodal point A through a first capacitance C1. The nodal point B is connected to ground through a second capacitance C2. The first current mirror circuit 19 is connected at an input terminal 19.1 to a positive terminal of a power supply 111 through a variable resistance R3.

The detector 4 includes a DC level shift circuit 15, a low pass filter 16, first and second NPN transistors Q100 and Q101 together composing a differential switch, and a current mirror circuit 17. The DC level shift circuit 15 is connected at an input terminal to an output of the BPF 3 and a base of the second NPN transistor Q101, and an output terminal to an input terminal of the low pass filter 16. The low pass filter 16 is connected at an output terminal to a base of the first NPN transistor Q100. The first NPN transistor Q100 is connected at an emitter to an output terminal 23.2 of the second current mirror circuit 23. The second NPN transistor Q101 is connected at an emitter to the output terminal 23.2 of the second current mirror circuit 23 and at a collector to an output terminal 17.1 of the current mirror circuit 17. An output 17.2 of the current mirror circuit 17 is connected to a nodal point C. The nodal point C is connected to an input of the wave-form shaping circuit 5, an output terminal 23.3 of the second current mirror circuit 23, and ground through a capacitance C3. An output terminal 23.1 of the second current mirror circuit 23 is connected to a positive terminal of the power supply 111 through a resistance R4.

The wave-form shaping circuit 5 includes a hysteresis comparator 18. The hysteresis comparator 18 is connected at an input terminal to the nodal point C of the detector 4, at an output terminal to an output terminal 6 of the infrared ray receiving circuit, and at a hysteresis width control terminal to an output terminal 20.2 of the third current mirror circuit 20. An input 20.1 of the third current mirror circuit 20 is connected to a positive terminal of the power supply 111 through a resistance R11.

FIG. 3 shows an example of a circuitry structure of the first and second variable trans-conductance amplifiers 11 and 13. The variable trans-conductance amplifier includes first to fourth NPN transistors Q1 to Q4, first and second PNP transistors Q5 and Q6, first and second diodes D1 and D2, first and second resistances R1 and R2, and a current supply 11. The first NPN transistor Q1 is connected at a base to the non-reversed input terminal of the variable trans-conductance amplifier, at a collector to a nodal point D, and an emitter to one terminal of the first resistance R1. The second NPN transistor Q2 is connected at a base to the reversed input terminal thereof, at a collector to a nodal point E, and at an emitter to one terminal of the second resistance R2. The first and second resistances R1 and R2 are connected in common to a nodal point F. The current supply 11 is connected between the nodal point F and ground. The first diode D1 is connected at a cathode to the nodal point D and at an anode to a positive terminal of the power supply 111. The second diode D2 is connected at a cathode to the nodal point E and at an anode to the positive terminal of the power supply 111. The third NPN transistor Q3 is connected at a base to the nodal point E, at a collector to a nodal point G, and at an emitter to a nodal point J which is connected to an output 19.2 (19.4) of the first current mirror circuit 19. The fourth NPN transistor Q4 is connected at a base to the nodal point D, at a collector to the positive terminal of the power supply 111, and at an emitter to the nodal point J. The first PNP transistor Q5 is connected at a base to a nodal point H which is connected to the nodal point G, at a collector to the nodal point G, and at an emitter to the positive terminal of the power supply 111. The second PNP transistor Q6 is connected at a base to the nodal point H, at a collector to an output terminal of the variable trans-conductance amplifier 11(13), and at an emitter to the positive terminal of the power supply 111.

In the variable trans-conductance amplifiers 11 and 13, the mutual conductance $g_m$ thereof is represented by the following formula (1):

$$g_m = \frac{I_Z}{4(KT/q) + 2 \times R_E \times I_1} \quad (1)$$

where K is the Boltzmann constant, T is the absolute temperature, q is an amount of charges of an electron, $R_E$ is a resistance value of the resistances R1 and R2 (it is supposed that R1 and R2 have the same resistance $R_E$), $I_1$ is a pulling current of the current supply I1, and $I_2$ is a pulling current of the output terminal 19.2 (19.4) of the first current mirror circuit 19. As it is clear by the formula (1), the mutual conductance $g_m$ becomes large as $I_2$ becomes large, and becomes small as $I_1$ becomes large. Therefore, a terminal connected to the nodal point F through which the pulling current $I_1$ flows will be called as a negative control terminal, and a terminal connected to the nodal point J through which the pulling current $I_2$ flows will be called as a positive control terminal. In the variable trans-conductance amplifier 11(13), the mutual conductance $g_m$ is adjusted by varying the value of $I_2$ while $I_1$ is fixed to be a predetermined value.

On the other hand, the tuning frequency $f_0$ is represented by the following formula (2):

$$f_0 = \frac{1}{2\pi \sqrt{C_1 \times C_2}} \sqrt{g_{m1} \times g_{m2}}$$
$$= \frac{1}{2\pi \sqrt{C_1 \times C_2}} \times \frac{I_Z}{4(KT/q) + 2 \times R_E \times I_1} \quad (2)$$

where $C_1$ and $C_2$ are values of the capacitances $C_1$ and $C_2$, respectively, and $g_{m1}$ and $g_{m2}$ are mutual conductances of the first and second variable trans-conductance amplifiers 11 and 13 respectively. As it is clear by the formula (2), $f_0$ can be adjusted by varying $I_1$ with using the variable resistance R3.

In the infrared ray receiving circuit, the tuning frequency $f_0$ may be affected by dispersions of values of the resistances and capacitances due to the change of conditions of the impurity diffusion steps in the fabrication process thereof, because the infrared ray receiving circuit is fabricated in the semiconductor process. If the values of the resistances change, the currents also change. As understood by the formula (2), $I_1$ may not affect the value of $f_0$ substantially as it is multiplied with $R_E$, however, $I_2$ may affect the value of $f_0$. Therefore, the variable resistance R3 is provided separately outside the integrated circuit mainly composing the infrared ray receiving circuit to avoid dispersion of the value of the resistance R3 due to the dispersion of the process conditions. On the other hand, $C_1$ and $C_2$ may also affect the value of $f_0$. Therefore, the value of the variable resistance R3 is adjusted after the fabrication of the integrated circuit composing the infrared ray receiving circuit to cancel the change of $C_1$ and $C_2$.

Figure 4A:
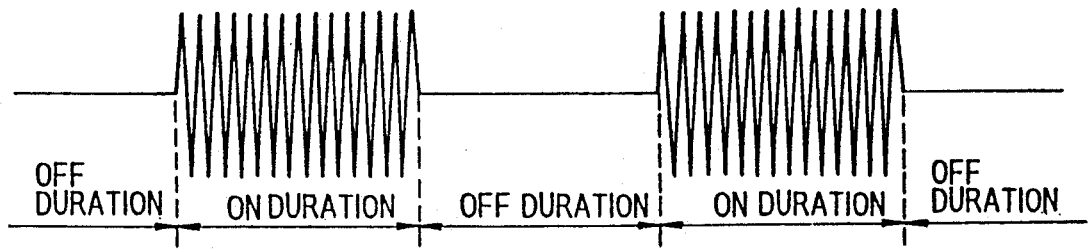
FIGS. 4A to 4C are diagrams showing wave-forms of signals in the variable trans-conductance amplifier of the band pass filter in the conventional infrared ray receiving circuit.

Next, operation of the detector 4 will be explained in conjunction with FIGS. 4A to 4C. FIG. 4A shows an example of the PPM signal supplied to the infrared ray receiving circuit. The PPM signal includes ON duration of the carrier wave and OFF duration of only a DC level signal. When the PPM signal is supplied to the detector 4 from the BPF 3, the PPM signal is divided to be transmitted through two electrical paths, one of which is supplied directly to the base of the NPN transistor Q101, and the other is supplied to the DC level shifting circuit 15 where its DC level is increased to be a predetermined level. The DC level shifted signal is supplied to the low pass filter 16 where the component of the carrier wave is stopped, and then is supplied to the base of the NPN transistor Q100. The signal supplied to the base of the NPN transistor Q100 is used as a reference signal of a threshold for the PPM signal supplied to the base of the NPN transistor Q101.

Figure 4B:
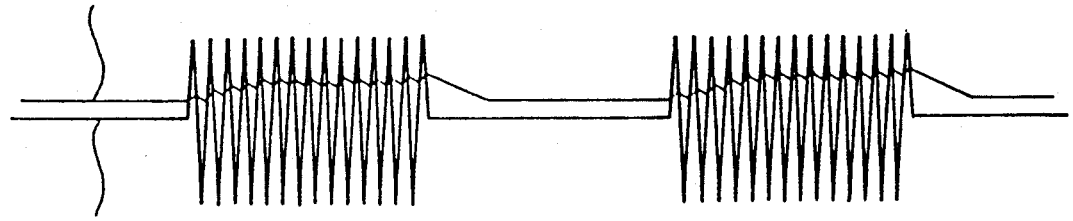

FIG. 4B shows the signals supplied to the bases of the NPN transistors Q100 and Q101. There flows no current through the NPN transistor Q101 when the base potential of the NPN transistor Q101 is lower than that of the NPN transistor Q100, however, the NPN transistor Q101 becomes at ON state when the base potential of the NPN transistor Q101 is higher than that of the NPN transistor Q100, and a collector current thereof begins flowing through the current mirror circuit 17 having input/output current ratio of 1:1 from the output terminal thereof. By determining the collector current $I_3$ of the NPN transistor Q101 of ON state to be larger by a predetermined difference than the pulling current $I_4$ of the output terminal 23.3 of the current mirror circuit 23, the capacitance C3 is charged by a difference current of $I_4$ and $I_3$ when the NPN transistor Q101 is at ON state and is discharged to make flow the current $I_3$ when the NPN transistor Q101 is at OFF state.

Figure 4C:
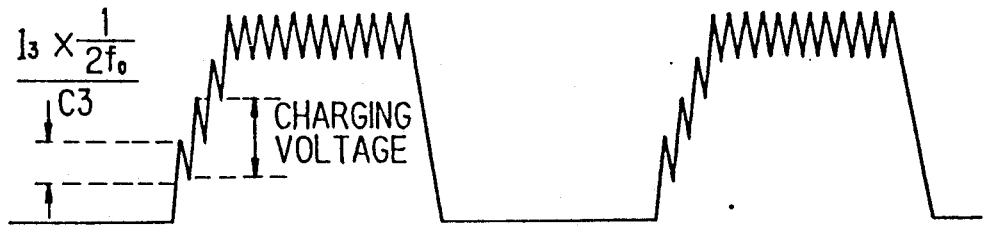

FIG. 4C shows the charging and discharging potentials of the capacitance C3. The potential of the capacitance C3 increases to be a high level with having a saw-tooth wave due to the charging by the difference between $I_4$ and $I_3$ and the discharging by only $I_3$ at the ON duration of the PPM signal, and decreases to be a low level by discharging of $I_3$ at the OFF duration thereof. The charging and discharging potentials will be represented by the following formulas (3) and (4):

$$\text{charging potential} = \frac{I_4 - I_3}{C_3} \times \frac{1}{2f_1} \quad (3)$$

$$\text{discharging potential} = \frac{I_3}{C_3} \times \frac{1}{2f_1} \quad (4)$$

where $f_1$ is the frequency of the carrier wave of the PPM signal and $C_3$ is the value of the capacitance C3. The signal of saw-tooth wave supplied from the capacitance C3 is restored to be square waves obtained at the output terminal 6.

Figure 5:
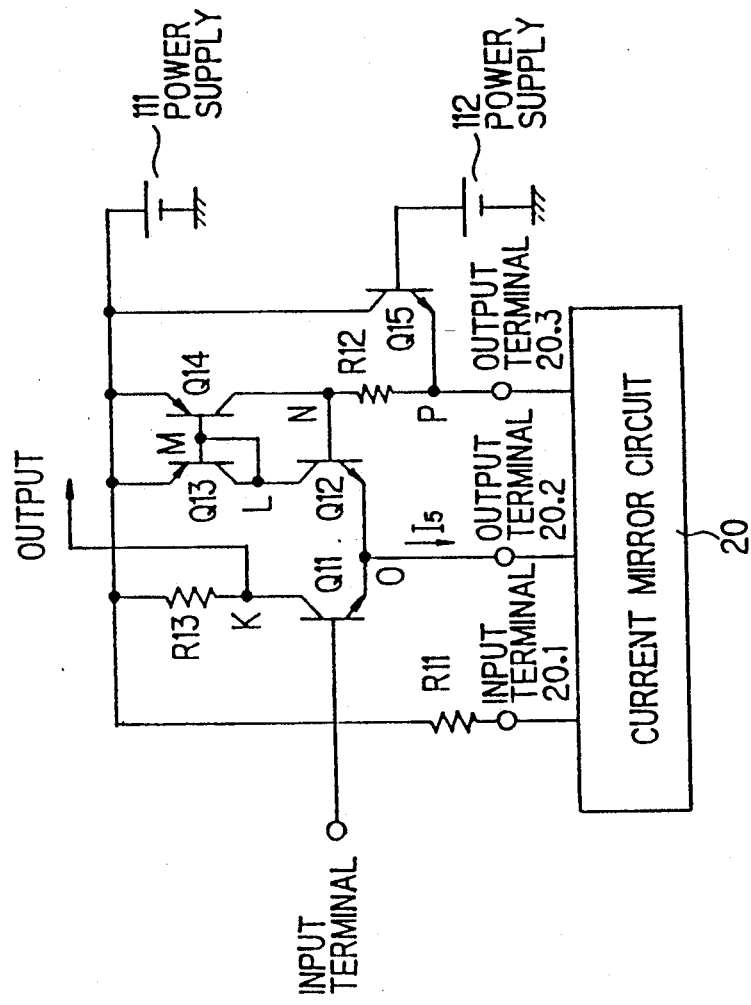
FIG. 5 is a circuitry diagram of a hysteresis comparator composing a wave-form shaping circuit of the conventional infrared ray receiving circuit.

FIG. 5 shows an example of the hysteresis comparator 18 composing the wave-form shaping circuit 5. The hysteresis comparator 18 includes three NPN transistors Q11, Q12 and Q15, two PNP transistors Q13 and Q14, and three resistances R11 to R13. The NPN transistor Q11 is connected at a base to an input terminal to which the signal of saw-tooth wave is supplied, at a collector to a nodal point K which is connected to the output terminal 6, and at an emitter to a nodal point O. The NPN transistor Q12 is connected at a base to a nodal point N, at a collector to a nodal point L, and at an emitter to the nodal point O. The NPN transistor Q15 is connected at a base to a positive terminal of a power supply 112, at a collector to a positive terminal of the power supply 111, and at an emitter to a nodal point P which is connected to an output terminal 20.3 of the current mirror circuit 20. The PNP transistor Q13 is connected at a base to a nodal point M which is connected to the nodal point L, at a collector to the nodal point L, and at an emitter to the positive terminal of the power supply 111. The PNP transistor Q14 is connected at a base to the nodal point M, at a collector to the nodal point N, and at an emitter to the positive terminal of the power supply 111. The resistance R11 is connected between the positive terminal of the power supply 111 and an input terminal 20.1 of the current mirror circuit 20. The resistance R12 is connected between the nodal points N and P. The resistance R13 is connected between the positive terminal of the power supply 111 and the nodal point K.

Next, operation of the hysteresis comparator 18 will be explained. FIG. 6A shows the base potentials of the NPN transistors Q11 and Q12, and FIG. 6B shows the potential of the output terminal 6. When the base potential of the NPN transistor Q11 is high, the NPN transistor Q11 becomes at ON state and the NPN transistor Q12 becomes at OFF state. In such a state, the base potential of the NPN transistor Q12 which is equal to the emitter potential of the NPN transistor Q15 becomes low. When the base potential of the NPN transistor Q11 is low, the NPN transistor Q12 becomes at ON state. Therefore, a collector current of the NPN transistor Q12 flows through the resistance R12 from a current mirror circuit consisting of the PNP transistors Q13 and Q14, so that the base potential of the NPN transistor Q12 increases to be high. In such a state, the voltage generated across the two terminals of the resistance R12 is represented by the following formula (5):

$$I_5 \times R_{12} \quad (5)$$

where $I_5$ is the pulling current of the output terminal 20.2 of the current mirror circuit 20 and $R_{12}$ is the value of the resistance R12. Therefore, a differential amplifier consisting of the NPN transistors Q11 and Q12 can operate as a hysteresis comparator having a threshold voltage of $I_5 \times R_{12}$. The threshold voltage thereof is proportional to $I_5$, so that it can be controlled by changing the value of $I_5$.

As explained above, the PPM modulated signal is removed of unnecessary signal components and noises, detected and shaped by the BPF 3, the detector 4 and the wave-form shaping circuit 5 to be obtained at the output terminal 6.

As set out before, the charging and discharging potentials of C3 are represented by the formulas (3) and (4), however, the potential thereof changes in accordance with the change of the value of the capacitance C3, the pulling current $I_3$ of the output terminal 23.3 of the current mirror circuit 23, the collector current $I_4$ of the NPN transistor Q101 at ON state, and the frequency $f_1$ of the carrier wave of the PPM signal. The values of the capacitances and the resistances in the infrared ray receiving circuit vary due to the dispersion of the conditions of the fabrication process thereof. If at least one condition selected from conditions that the value of the capacitance C3 is small, the currents $I_3$ and $I_4$ are large due to the small values of the resistances in the integrated circuit composing the infrared ray receiving circuit, and the carrier frequency $f_1$ is low exists, the charging and discharging potentials of C3 become large. If the discharging potentials of the C3 become larger than the hysteresis width of the threshold (difference between the high and low levels) in the hysteresis comparator 18, the difference between the charging and discharging potentials of C3 (the difference between a peak and a bottom of a voltage of C3) becomes greater than a hysteresis width as originally prescribed, so that hair peaks are generated in the output signal of the hysteresis comparator 18, as shown in FIG. 7. On the other hand, if the value of the capacitance C3 is set to be large, or the currents $I_3$ and $I_4$ are set to be small in order to avoid the generation of the hair peaks, the potential of C3 may not increase to be high sufficiently at a state that a PPM signal having a short ON duration is supplied thereto, so that the pulse width of the output signal of the hysteresis comparator 18 becomes short, as shown in FIG. 8C. The output signal of the hysteresis comparator 18 is supplied directly to the output terminal 6 as an output signal of the infrared ray receiving circuit, so that the generation of the output signal having the hair peaks or the short pulse width causes mulfunction of a device such as a microcomputer, etc. connected with the output terminal 6.

Figure 9:
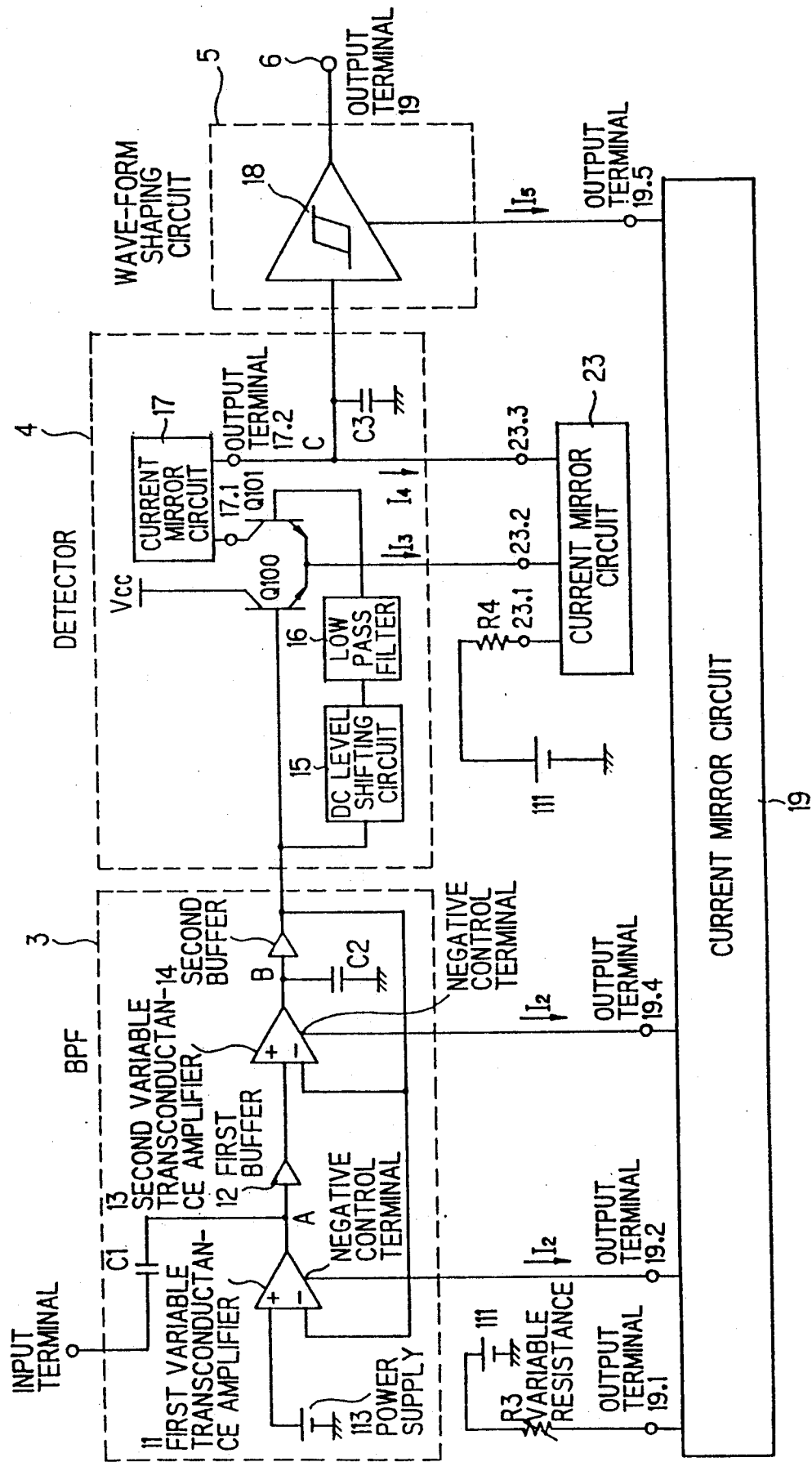
FIG. 9 is a block diagram of an infrared ray receiving circuit in a first preferred embodiment according to the invention.

Next, an infrared ray receiving circuit in a first preferred embodiment will be explained. As shown in FIG. 9, the basic structure of the infrared ray receiving circuit is the same as that of the conventional infrared ray receiving circuit in FIG. 1, except that a hysteresis comparator 18 composing an wave-form shaping circuit 5 is supplied with a pulling current $I_5$ from an output terminal 19.5 of a current mirror circuit 19 which also supplies pulling currents to variable trans-conductance amplifiers of a BPF 3, the DC level shifting circuit 15 and the low pass filter 16 are connected between the input terminal and the base of the NPN transistor Q101 in the detector 4, and the variable trans-conductance amplifiers 11 and 13 are modified.

Figure 10:
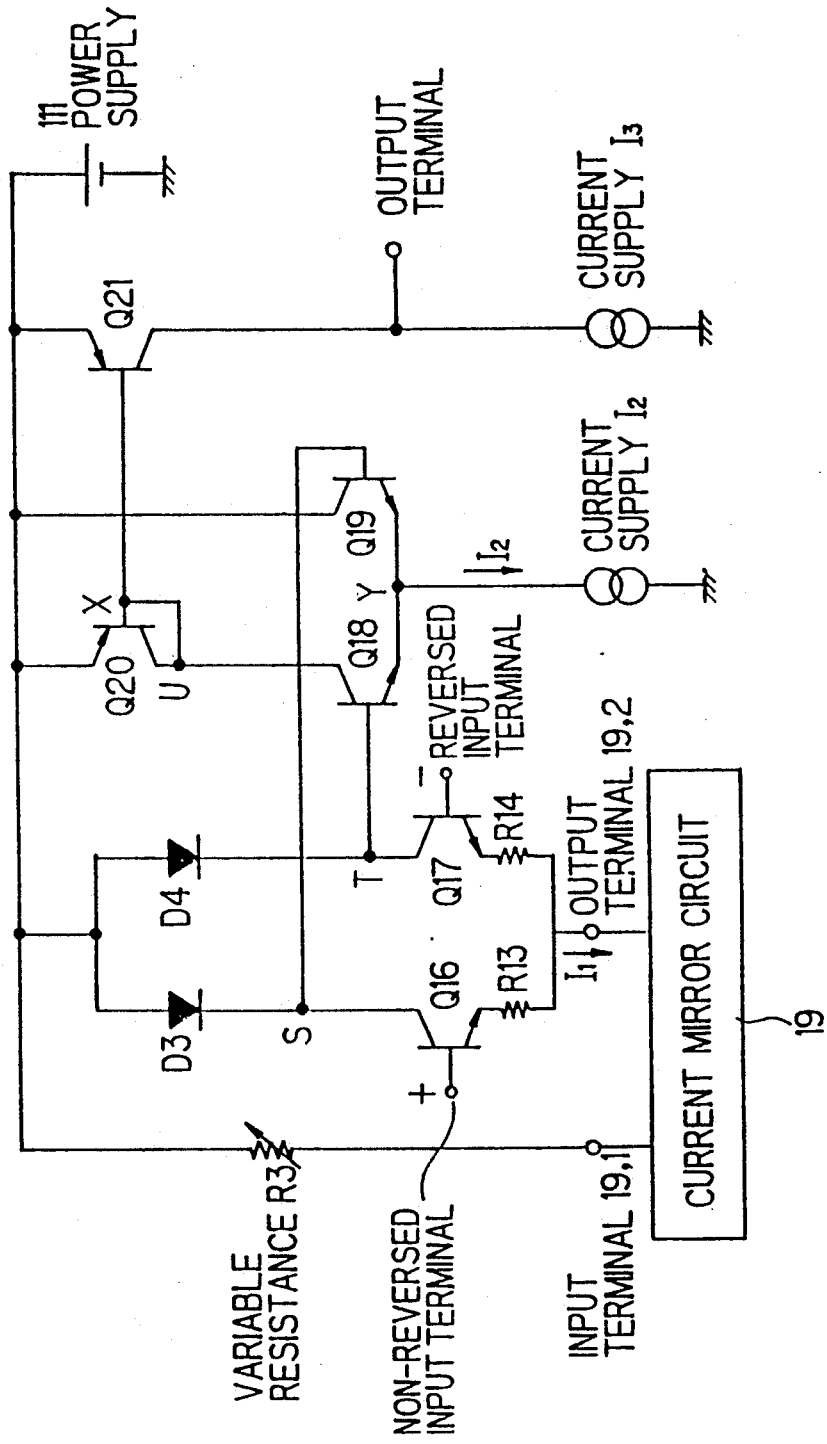
FIG. 10 is a circuitry diagram of a variable trans-conductance amplifier of a band pass filter in the infrared ray receiving circuit in the first preferred embodiment according to the invention.

FIG. 10 shows an example of a modified circuitry structure of the first and second variable trans-conductance amplifiers 11 and 13. The variable trans-conductance amplifier includes first to fourth NPN transistors Q16 to Q19, first and second PNP transistors Q20 and Q21, first and second diodes D3 and D4, first and second resistances R13 and R14, and first and second current supplies 12 and 13. The first NPN transistor Q16 is connected at a base to the non-reversed input terminal of the variable trans-conductance amplifier, at a collector to a nodal point S, and an emitter to one terminal of the first resistance R13. The second NPN transistor Q17 is connected at the reversed input terminal thereof, at a collector to a nodal point T, and at an emitter to one terminal of the second resistance R14. The first and second resistances R13 and R14 are connected in common to an output terminal 19.2 of the current mirror circuit 19. The first diode D3 is connected at a cathode to the nodal point S and at an anode to a positive terminal of the power supply 111. The second diode D4 is connected at a cathode to the nodal point T and at an anode to the positive terminal of the power supply 111. The third NPN transistor Q18 is connected at a base to the nodal point T, at a collector to a nodal point U, and at an emitter to a nodal point Y. The fourth NPN transistor Q19 is connected at a base to the nodal point S, at a collector to the positive terminal of the power supply 111, and at an emitter to the nodal point Y. The first PNP transistor Q20 is connected at a base to a nodal point X which is connected to the nodal point U, at a collector to the nodal point U, and at an emitter to the positive terminal of the power supply 111. The second PNP transistor Q21 is connected at a base to the nodal point X, at a collector to an output terminal of the variable trans-conductance amplifier, and at an emitter to the positive terminal of the power supply 111. The first current supply I2 is connected between the nodal point Y and ground. The second current supply I3 is connected between the output terminal of the variable trans-conductance amplifier and ground.

Next, operation of the variable trans-conductance amplifier will be explained. The mutual conductance $g_m$ of the variable trans-conductance amplifier can be changed in accordance with the change of the pulling current $I_1$ of the output terminal 19.2 of the current mirror circuit 19 by changing the value of the variable resistance R3 while fixing the current $I_2$ of the current supply I2.

If the value of the capacitance C3 becomes small due to the fabrication dispersion, the charging and discharging current of the capacitance C3 becomes large. However, the values of the capacitances C1 and C2 of the BPF 3 become also small in proportion to that of the capacitance C3, because the capacitances C1 to C3 are fabricated to be matched each other in the same process, so that the tuning frequency $f_0$ becomes large, as understood by the formula (2). On the other hand, if the value of the capacitance C3 becomes large, the tuning frequency $f_0$ becomes small. In such a case, the hysteresis width of the hysteresis comparator 18 can be adjusted by adjusting $f_0$ by changing the value of the variable resistance R3 to be small or large to make $I_1$ large or small and changing the pulling current $I_5$ of the output terminal 19.5 of the current mirror circuit 19 to be large or small.

If the values of the resistances are divided to be small to make $I_3$ and $I_4$ large, the charging and discharging potential of the capacitance C3 becomes high, however, $I_2$ becomes large, so that $f_0$ becomes large. On the other hand, if the value of the resistances are large, $f_0$ becomes small. In such a case, the hysteresis width of the hysteresis comparator 18 can be adjusted by adjusting $f_0$ by changing the value of the variable resistance R3 to be small or large to make $I_1$ large or small and changing the pulling current $I_5$ of the output terminal 19.5 of the current mirror circuit 19 to be large or small.

If the frequency $f_1$ of the carrier wave of the PPM signal is low, the charging and discharging potential of the capacitance C3 becomes high. On the other hand, if $f_1$ is high, the charging and discharging potential of the capacitance C3 becomes low. In such a case, the hysteresis width of the hysteresis comparator 18 can be adjusted by adjusting $f_0$ by changing the value of the variable resistance R3 to be small or large to make $I_1$ large or small and changing the pulling current $I_5$ of the output terminal 19.5 of the current mirror circuit 19 to be large or small.

Figure 11:
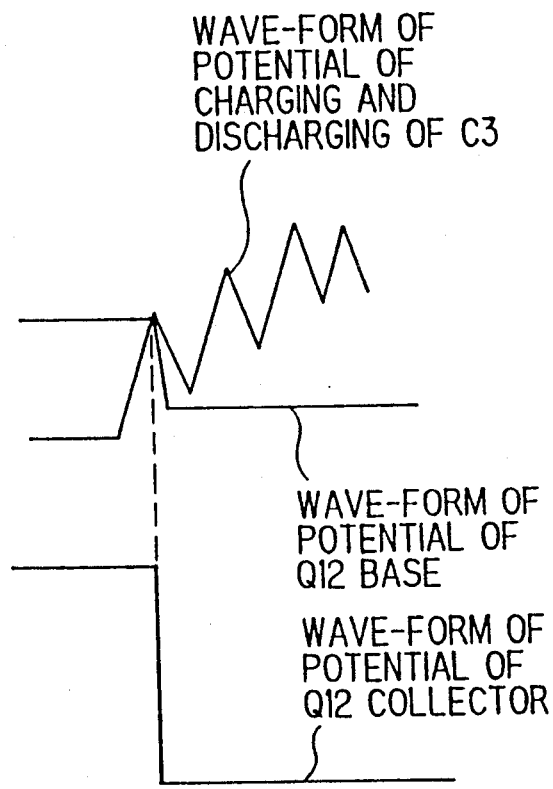
FIG. 11 is a diagram showing wave-forms of signals for explaining an advantage of the infrared ray receiving circuit in the first preferred embodiment.

As explained above, the hysteresis width of the hysteresis comparator 18 can be adjusted, so that the generation of hair peaks in the output signal of the hysteresis comparator 18 caused by the potential difference between the peak of the charging voltage of C3 and the bottom of the discharging voltage which is larger than the hysteresis width can be avoided. In FIG. 11, the wave-form of the output signal of the hysteresis comparator 18 is shown as that of the potential of the base of the NPN transistor Q12, and it is observed that there is no hair peak in the output signal thereof. On the other hand, it may be avoided that the potential of C3 does not increase to be high sufficiently at a state that the PPM signal having short ON duration is supplied thereto, when a large capacitance is provided to avoid the generation of the hair peaks so that the pulse width of the output signal of the hysteresis comparator 18 becomes short.

Figure 12:
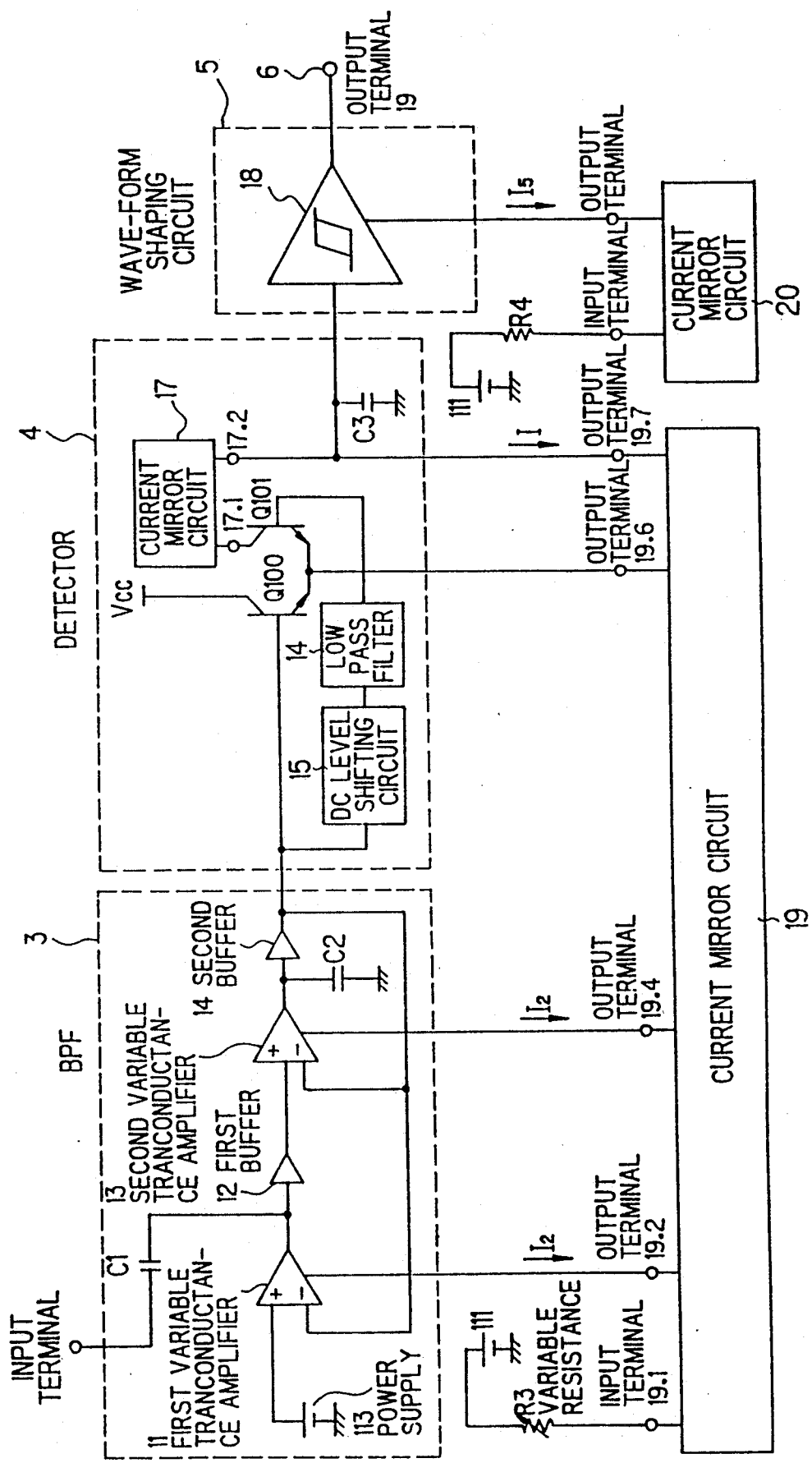
FIG. 12 is a block diagram of an infrared ray receiving circuit in a second preferred embodiment according to the invention.

Next, an infrared ray receiving circuit in a second embodiment will be explained. As shown in FIG. 12, the basic structure of the infrared ray receiving circuit is the same as that of the infrared ray receiving circuit in the first preferred embodiment, except that a hysteresis comparator 18 composing an wave-form shaping circuit 5 is supplied with a pulling current $I_5$ from a current mirror circuit 20, and a detector 4 is supplied with a pulling current from a current mirror circuit 19 which also supplies pulling currents to variable trans-conductance amplifiers of a BPF 3. In more detailed explanation, an output terminal 19.6 of the current mirror circuit 19 which functions as a first constant current supply is connected in common to emitters of the NPN transistors Q100 and Q101 which compose a differential switch. The NPN transistor Q101 is connected at a collector to an input terminal 17.1 of a current mirror circuit 17. An output terminal 17.2 of the current mirror circuit 17 is connected to one terminal of a capacitance C3, an input terminal of a hysteresis comparator 18, and an output terminal 19.7 of the current mirror circuit 19. A current supplied from the output terminal 19.6 of the current mirror circuit 19 is reversed of polarization at the current mirror circuit 17, and is supplied to the capacitance C3 to be charged. An output terminal 19.7 of the current mirror circuit 19 as a second constant current supply functions as a current supply of discharging of the capacitance C3. Output terminals 19.2 and 19.4 of the current mirror circuit 19 functions as current supplies for determining the tuned frequency $f_0$ of the BPF 3. An input terminal 19.1 of the current mirror circuit 19 is connected to a power supply 111 through a variable resistance R3.

If the value of the capacitance C3 becomes small due to the fabrication dispersion, the currents of the first and second current supplies are required to be small in order to obtain a predetermined wave-form of an input signal supplied to the hysteresis comparator 18. However, the values of the capacitances C1 and C2 of the BPF 3 become also small in proportion to that of the capacitance C3, because the capacitances C1 to C3 are fabricated to be matched each other in the same process, so that the value of the tuning frequency $f_0$ shifts to be large, as understood by the formula (2). On the other hand, if the value of the capacitance C3 becomes large, the tuning frequency $f_0$ shifts to be small. In such a case, the tuning frequency $f_0$ can be adjusted by changing the value of the variable resistance R3. The currents of the first and second constant current supplies can be also adjusted to be large or small by changing the value of the variable resistance R3. Therefore, the wave-form of the input signal of the hysteresis comparator 18 can be adjusted by adjusting the tuned frequency $f_0$ of the BPF 3 with using currents which are adjustable by the variable resistance R3 for the first and second constant current supplies of the BPF 3.

If the frequency of the carrier wave of the PPM signal is low, the charging and discharging times of the capacitance C3 become long. Therefore, the currents of the first and second constant current supplies are required to be small to adjust the wave-form of the input signal of the hysteresis comparator 18. The currents of the first and second constant current supplies are adjusted by changing the value of the variable resistance R3 to be large in conjunction with the matching operation of the frequency $f_0$ to the frequency of the carrier wave of the PPM signal. Thus, the wave-form of the input signal of the hysteresis comparator 18 can be maintained to be a predetermined wave-form.

Figure 13:
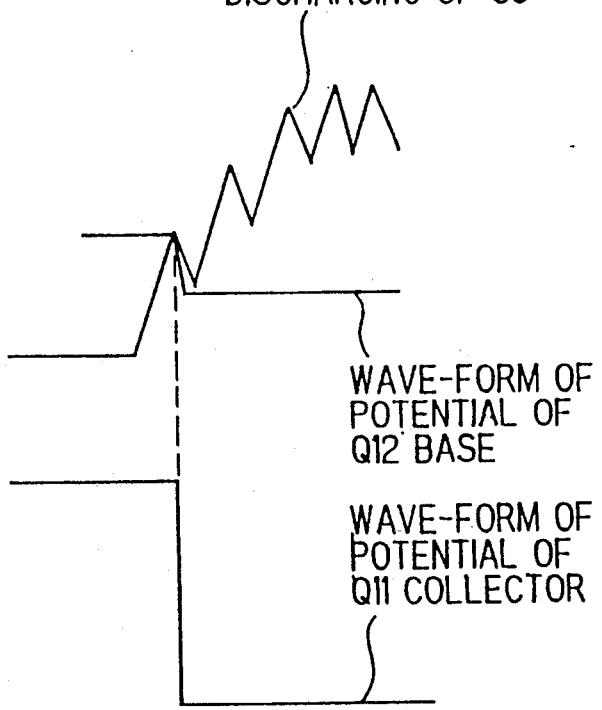

As shown in FIGS. 13 and 14, the disadvantages of the conventional infrared ray receiving circuit as shown in FIGS. 7 and 8 are overcome by the self-adjustment of the potential wave-form of the capacitance C3 in this second preferred embodiment.

Additionally, in general, the variable resistance R3 which may be replaced by a trimming resistance in some cases is provided separately with a semiconductor integrated circuit composing the infrared ray receiving circuit, and the wave-form of the input signal of the hysteresis comparator 18 is adjusted by the variable resistance R3, so that the wave-form thereof may not be affected by dispersion of the values of the resistances in the semiconductor integrated circuit.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An infrared ray receiving circuit, comprising:
   a band pass filter comprising first and second variable trans-conductance amplifiers, said band pass filter being supplied with an input PPM signal;
   a detector comprising a differential switch, said detector being supplied with an output signal of said band pass filter; and
   a wave-form shaping circuit comprising a hysteresis comparator, said wave-form shaping circuit being supplied with an output signal of said detector;
   wherein said first and second variable trans-conductance amplifiers of said band pass filter are controlled by first and second output signals of first and second output terminals of a current mirror circuit; and
   said hysteresis comparator of said wave-form shaping circuit is controlled by a third output signal of a third output terminal of said current mirror circuit, whereby a hysteresis width of said hysteresis comparator is adjusted by said third output signal of said current mirror circuit.

2. An infrared ray receiving circuit, according to claim 1, wherein:
   said current mirror circuit is provided with an input terminal connected through a variable resistance to a power supply, said first to third output signals of said current mirror circuit being adjusted in current value by said variable resistance.

3. An infrared ray receiving circuit, according to claim 1, wherein each of said first and second variable trans-conductance amplifiers of said band pass filter comprises:
   first to fourth NPN transistors, first and second PNP transistors, first and second diodes, first and second resistances, and first and second current supplies; wherein
   said first NPN transistor is connected at a base to a non-reversed input terminal, at a collector to a first nodal point, and an emitter to a first terminal of said first resistance;
   said second NPN transistor is connected at a reversed input terminal, at a collector to a second nodal point, and at an emitter to a first terminal of said second resistance;
   said third NPN transistor is connected at a base to said second nodal point, at a collector to a third nodal point, and at an emitter to a fourth nodal point;
   said fourth NPN transistor is connected at a base to said first nodal point, at a collector to a positive terminal of a power supply, and at an emitter to said fourth nodal point;
   said first PNP transistor is connected at a base to a fifth nodal point which is connected to said third nodal point, at a collector to said third nodal point, and at an emitter to said positive terminal of said power supply;
   said second PNP transistor is connected at a base to said fourth nodal point, at a collector to an output terminal of said variable trans-conductance amplifier, and at an emitter to said positive terminal of said power supply;
   said first and second resistances are connected in common at each terminal to either one of said first and second output terminals of said current mirror circuit;
   said first diode is connected ar a cathode to said first nodal point and at an anode to said positive terminal of said power supply;
   said second diode is connected at a cathode to said second nodal point and at an anode to said positive terminal of said power supply;
   said first current supply is connected between said fourth point and ground; and
   said second current supply is connected between said output terminal of said variable trans-conductance amplifier and ground.

4. An infrared ray receiving circuit, comprising:
   a band pass filter comprising first and second variable trans-conductance amplifiers, said band pass filter being supplied with an input PPM signal;
   a detector comprising a differential switch, said detector being supplied with an output signal of said band pass filter; and
   a wave-form shaping circuit comprising a hysteresis comparator, said wave-form shaping circuit being supplied with an output signal of said detector;
   wherein said first and second variable trans-conductance amplifiers of said band pass filter are controlled by first and second output signals of first and second output terminals of a current mirror circuit; and
   said detector is controlled by a third output signal of third output terminal of said current mirror circuit, whereby a level of an output signal of said detector is adjusted by said third output signal of said current mirror circuit.

5. An infrared ray receiving circuit, according to claim 4, wherein:
   said current mirror circuit is provided with an input terminal connected through a variable resistance to a power supply, said first to third output signals of said current mirror circuit being adjusted in current value by said variable resistance.

* * * * *